March 15, 1932.    W. MERTÉ ET AL    1,849,681
PHOTOGRAPHIC THREE-LENS OBJECTIVE
Filed July 10, 1931
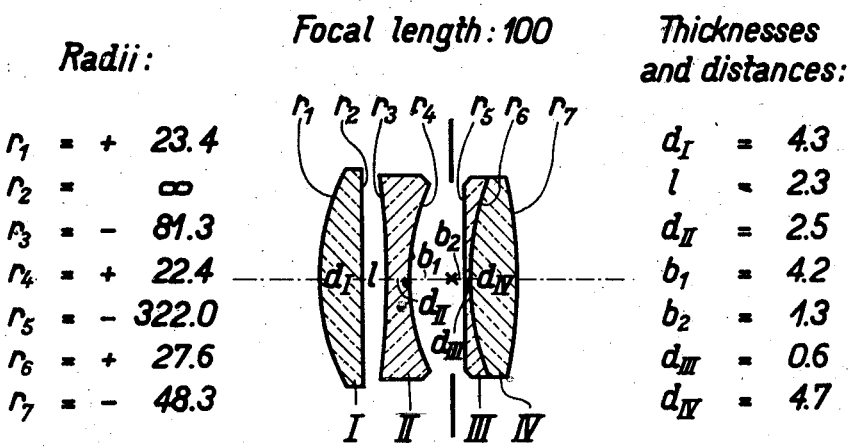
Fig. 1
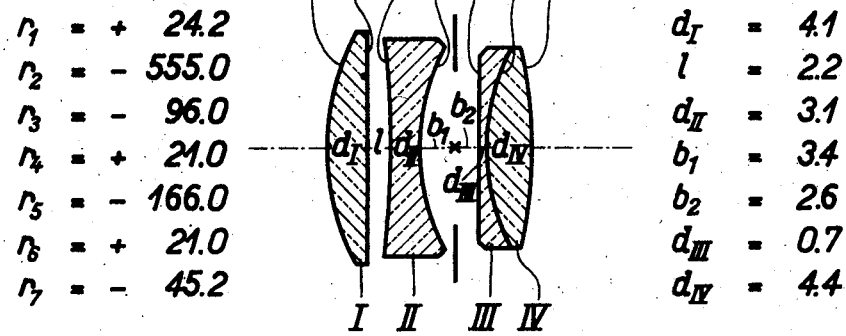
Fig. 2
Kinds of glass:
Fig.1
|  | I | II and III | IV |
|---|---|---|---|
| $n_d$ = | 1.58315 | 1.58215 | 1.67110 |
| $\nu$ = | 59.3 | 42.0 | 47.3 |
Fig.2
|  | I and IV | II | III |
|---|---|---|---|
| $n_d$ = | 1.67110 | 1.62004 | 1.58215 |
| $\nu$ = | 47.3 | 36.3 | 42.0 |
Inventors:
W. Willy Merté
Dr. Joseph ...

Patented Mar. 15, 1932                                                        1,849,681

UNITED STATES PATENT OFFICE

WILLY MERTÉ AND ERNST WANDERSLEB, OF JENA, GERMANY, ASSIGNORS TO FIRM CARL ZEISS, OF JENA, GERMANY

PHOTOGRAPHIC THREE-LENS OBJECTIVE

Application filed July 10, 1931, Serial No. 549,939, and in Germany July 17, 1930.

The present invention aims at improving those photographic three-lens objectives—i. e. spherically, astigmatically, comatically and chromatically corrected objectives—which have a dispersing part enclosed with intermediate air spaces by two converging parts whereof one consists of two cemented members, namely a converging and a diverging member, and whereof both are of glass of at least a medial refractive index, that is to say of a refractive index of at least 1.55 approximately. The invention applies especially to such objectives in which the spherical correction is effected at least for a medial aperture ratio, whereby for example the aperture ratio $$1:4\sqrt{2}(=1:5.657)$$

of the English diaphragm scaling may be considered as a medial aperture ratio, and whereby the diameter of the sharply defined image circle in the focal plane is approximately equal to the focal length. From the above it will be understood that universal objectives of great light transmitting capacity are concerned.

The invention provides objectives of the said kind which, with the usual extension of the field of view and with the usual image quality, afford especially good images and, respectively, an especially great image field, when, according to its absolute value, the radius of the front refractive surface of the isolated dispersing lens is given relatively to the radius of the first refractive surface of the objective a ratio greater than 2½, when, according to its absolute value, the radius of the last refractive surface of the objective is given relatively to the radius of the rear refracting surface of the isolated dispersing lens a ratio greater than 1¾, and when care is taken that the last said ratio is always inferior to the first said ratio, and, in addition thereto, when the vertex distance of the first part of the objective from the isolated diverging lens is inferior to 1½ times the vertex thickness of this lens. As a rule the aim of the invention is attained the more completely the smaller the value given the vertex distance. Therefore it is advisable to make the vertex distance even inferior to 1⅓ times the vertex thickness of the isolated dispersing lens. Further, with a view to obtain a specially good correction, it is advisable to so arrange the converging part of two cemented members that the convex side of the cemented surface faces the interior of the objective.

Two corresponding constructional examples are given in the annexed drawing as well as in the tables below. The radii, thicknesses and distances appearing therein are given in millimeters and refer to a focal length of the objective of 100 mm.

First example (Figure 1)

| Radii | Thicknesses and distances |
|---|---|
| $r_1 = +23.4$ | $d_I = 4.3$ |
| $r_2 = \infty$ | $l = 2.3$ |
| $r_3 = -81.3$ | $d_{II} = 2.5$ |
| $r_4 = +22.4$ | $b_1 = 4.2$ |
| $r_5 = -322.0$ | $b_2 = 1.3$ |
| $r_6 = +27.6$ | $d_{III} = 0.6$ |
| $r_7 = -48.3$ | $d_{IV} = 4.7$ |

Kinds of glass

| Lens | I | II=III | IV |
|---|---|---|---|
| $n_d$ | 1.58315 | 1.58215 | 1.67110 |
| $\nu$ | 59.3 | 42.0 | 47.3 |

Second example (Figure 2)

| Radii | Thicknesses and distances |
|---|---|
| $r_1 = +24.2$ | $d_I = 4.1$ |
| $r_2 = -555.0$ | $l = 2.2$ |
| $r_3 = -96.0$ | $d_{II} = 3.1$ |
| $r_4 = +21.0$ | $b_1 = 3.4$ |
| $r_5 = -166.0$ | $b_2 = 2.6$ |
| $r_6 = +21.0$ | $d_{III} = 0.7$ |
| $r_7 = -45.2$ | $d_{IV} = 4.4$ |

Kinds of glass

| Lens | I=IV | II | III |
|---|---|---|---|
| $n_d$ | 1.67110 | 1.62004 | 1.58215 |
| $\nu$ | 47.3 | 36.3 | 42.0 |

We claim:
1. A photographic objective, consisting of a dispersing part and two converging parts enclosing this dispersing part with intermediate air spaces, one of these converging parts being composed of two cemented members whereof the one is converging and the other diverging, the two converging lenses of the objective being of glass of a refractive index of at least 1.55 approximately, the radius of the front refractive surface of the isolated dispersing lens having relatively to the radius of the first refracting surface of the objective a ratio which, according to its absolute value, is greater than 2½, the radius of the last refracting surface of the objective having relatively to the radius of the rear refracting surface of the isolated dispersing lens a ratio which, according to its absolute value, is greater than 1¾, this last mentioned ratio being inferior to the first mentioned one, and the vertex distance of the first lens of the objective from the isolated dispersing lens being inferior to 1½ times the vertex thickness of this lens.

2. In an objective according to claim 1, the said vertex distance being inferior to 1⅓ times the vertex thickness of the isolated dispersing lens.

3. In an objective according to claim 1 the cemented surface of the converging part of two cemented members facing with its convex side of the interior of the objective.

WILLY MERTÉ.
ERNST WANDERSLEB.